United States Patent [19]

Oh

[11] Patent Number: 5,961,611
[45] Date of Patent: Oct. 5, 1999

[54] AUTOMATIC OPTION SETTING CIRCUIT

[75] Inventor: Kun Chang Oh, Seoul, Rep. of Korea

[73] Assignee: LG Semicon Co., Ltd., Chungcheongbuk, Rep. of Korea

[21] Appl. No.: 08/866,238

[22] Filed: May 30, 1997

[30] Foreign Application Priority Data

Dec. 27, 1996 [KR] Rep. of Korea ............ 96-73497

[51] Int. Cl.[6] .................. G06F 13/00; G06F 9/445
[52] U.S. Cl. ..................... 710/1; 713/1; 713/100
[58] Field of Search .................... 395/500, 828, 395/821, 823, 830, 834, 857, 651, 653; 365/230.03; 710/1; 713/1, 100

[56] References Cited

U.S. PATENT DOCUMENTS

| | | | |
|---|---|---|---|
| 5,263,003 | 11/1993 | Cowles et al. .................... | 365/230.03 |
| 5,263,148 | 11/1993 | Jones, Jr. et al. .................. | 395/500 |
| 5,450,570 | 9/1995 | Richek et al. ..................... | 395/500 |
| 5,559,965 | 9/1996 | Oztaskin et al. ................... | 710/104 |
| 5,655,148 | 8/1997 | Richman et al. ................... | 710/8 |
| 5,713,009 | 1/1998 | DeRosa, Jr. et al. ............... | 395/500 |
| 5,748,980 | 5/1998 | Lipe et al. ........................ | 710/8 |
| 5,768,542 | 6/1998 | Enstrom et al. ................... | 710/104 |

OTHER PUBLICATIONS

Standard Micro Systems, "Boot Configuration Word (BCW—Word 0)," FDC37C667 Specification, published Nov. 4, 1994, pp. 122–124.

*Primary Examiner*—Joseph E. Palys
*Assistant Examiner*—Nguyen Xuan Nguyen

[57] ABSTRACT

An automatic option setting circuit which automatically configures option settings for a device using pre-settable option setting information stored in a re-writable memory, and updates option settings in the re-writable memory when option settings are modified by the device.

17 Claims, 3 Drawing Sheets

F I G. 2
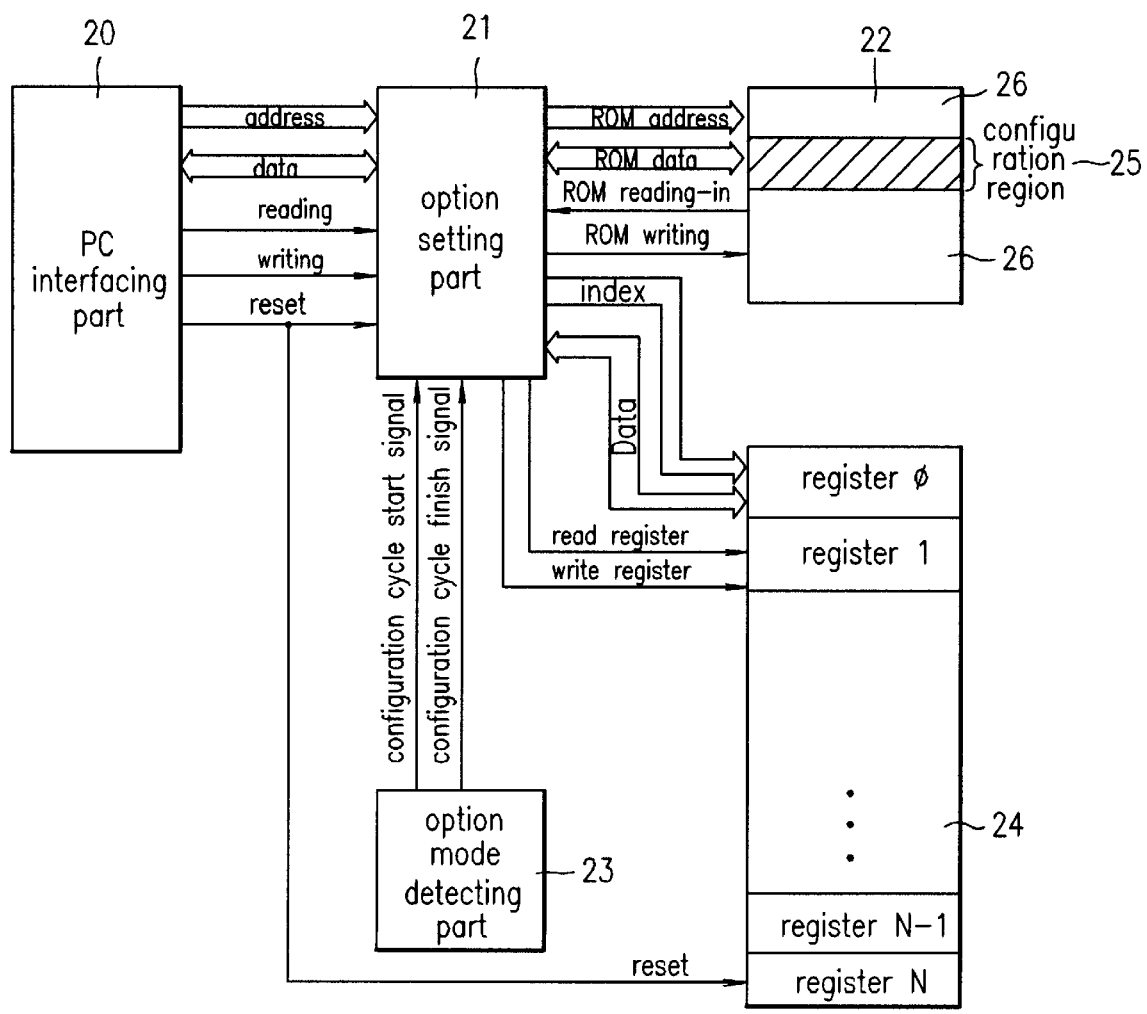

F I G.3a
configuration cycle start mode
F I G.3b
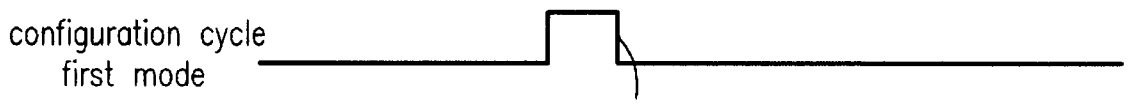
configuration cycle first mode
F I G.3c
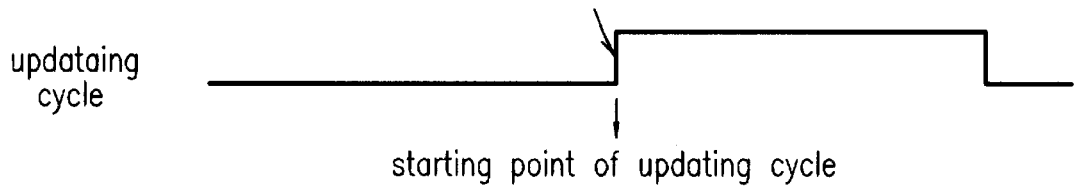
updataing cycle
starting point of updating cycle
F I G.3d
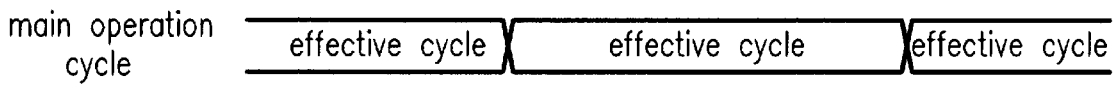
main operation cycle

AUTOMATIC OPTION SETTING CIRCUIT

BACKGROUND OF THE INVENTION

1. Field of the Invention

The present invention relates to an option setting circuit for a system configuration and, more particularly, to an automatic option setting circuit for a device with a re-writable memory.

2. Discussion of the Related Art

Devices used in, for example, an IBM PC(Personal Computer) environment are assigned a memory address region, input/output address region, interrupt types to be used, or DMA (Direct Memory Access) channels based in part on options set in a configuration control register. The option settings, which are set before starting an operation, control operating characteristics of the device.

In the methods for setting those options, there is, a first, hardware based, method which selectively applies 5V or 0V to achieve a preset value using a jumper (i.e., dip-switch). The 5V or 0V is defined in advance and the preset value determines an option. Options set according to this hardware method are maintained whether the system is on or off. In addition, there is, a second, software based, method which modifies a configuration control register. In this method the options for modifying the control register have been defined by a program after the system is booted. An option selected in the software method requires an access to the configuration control register every time a user boots the system. Currently, many devices employ the two methods.

A conventional option setting circuit will be explained with reference to the attached drawings. FIG. 1 is a block diagram of a system of a conventional option setting circuit.

The configuration control register 3 assigns resources, such as address regions, interrupt types to be used, DMA (Direct Memory Access) channels, and other options for a device in, for example, an IBM PC environment. As shown in FIG. 1, some of the options of the configuration control register can be set by means of a hardware jumper (i.e., dip-switch). The system of the conventional option setting circuit includes a PC interfacing part 1 for connecting the option setting circuit to a main system in the PC environment, a register access logic part 2 connected to the PC interfacing part 1 and having address/data bus lines for accessing a configuration control register 3, which has options to be selected defined therein, and a jumper 4 connected to a portion of the configuration control register 3 for applying 5V or 0V at the moment of power on start-up to set an option defined in the configuration register 3.

When a user desires to change the options set in the aforementioned conventional option setting circuit, a value set in the jumper 4 has to be adjusted manually before turning on the system. A different method of setting options in the configuration control register, instead of the hardware jumper method, is by means of a software program. When using a software program option setting method, the configuration control register needs to be accessed through particular input/output address regions. When it is intended to modify a set option, the program needs to be executed to access the configuration control register 3. When options are set by a software program, the last option settings are placed in a file to be automatically read-in without intervention by the user every time the PC is turned on, thereby setting the options. Consequently, the software program option setting involves using the PC processing unit to access the configuration control register.

However, conventional option setting techniques have the following problems.

First, the method of setting options through the hardware jumper method has the inconvenience that the system has be turned off to adjust the settings and then turned on to use the adjusted settings, and the user must manually operate the hardware (e.g., jumper or dip-switch) to adjust the option settings.

Second, the method of setting options by means of a software program has the inconvenience that, because options are reset when the computer is turned off, a software program has to log any modifications to the option settings in a program file and reload them every time the system is turned on. That is, the software program has to access the control register every time the computer is turned to reload the option settings which requires extra processing by the PC processing unit.

SUMMARY OF THE INVENTION

Accordingly, the present invention is directed to an automatic option setting circuit that substantially obviates one or more of the problems due to limitations and disadvantages of the related art.

An object of the present invention is to provide an automatic option setting circuit for a device using a re-writable memory and which does not require manually setting hardware units or a PC processing unit to access the configuration register.

To achieve these and other advantages and in accordance with the purpose of the present invention, as embodied and broadly described, the automatic option setting circuit includes an automatic option setting circuit, comprising a configuration control register having at least one storage location, each storage location for storing option setting information for a device, a memory storing pre-settable option setting information, and option processing means for pre-setting said storage location in said configuration control register with said pre-settable option setting information stored in said memory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

In the drawings:

FIG. 2 is a block diagram of a system of an automatic option setting circuit in accordance with a preferred embodiment of the present invention; and, FIGS. 3a–3b illustrate the configuration cycle of the option setting operation of the preferred embodiment.

FIG. 3c illustrates the updating cycle of the ROM of the preferred embodiment.

FIG. 3d illustrates the main operation cycle of a PC processing unit relating to the option setting operation.

DETAILED DESCRIPTION OF THE PREFERRED EMBODIMENT

Figure 1:
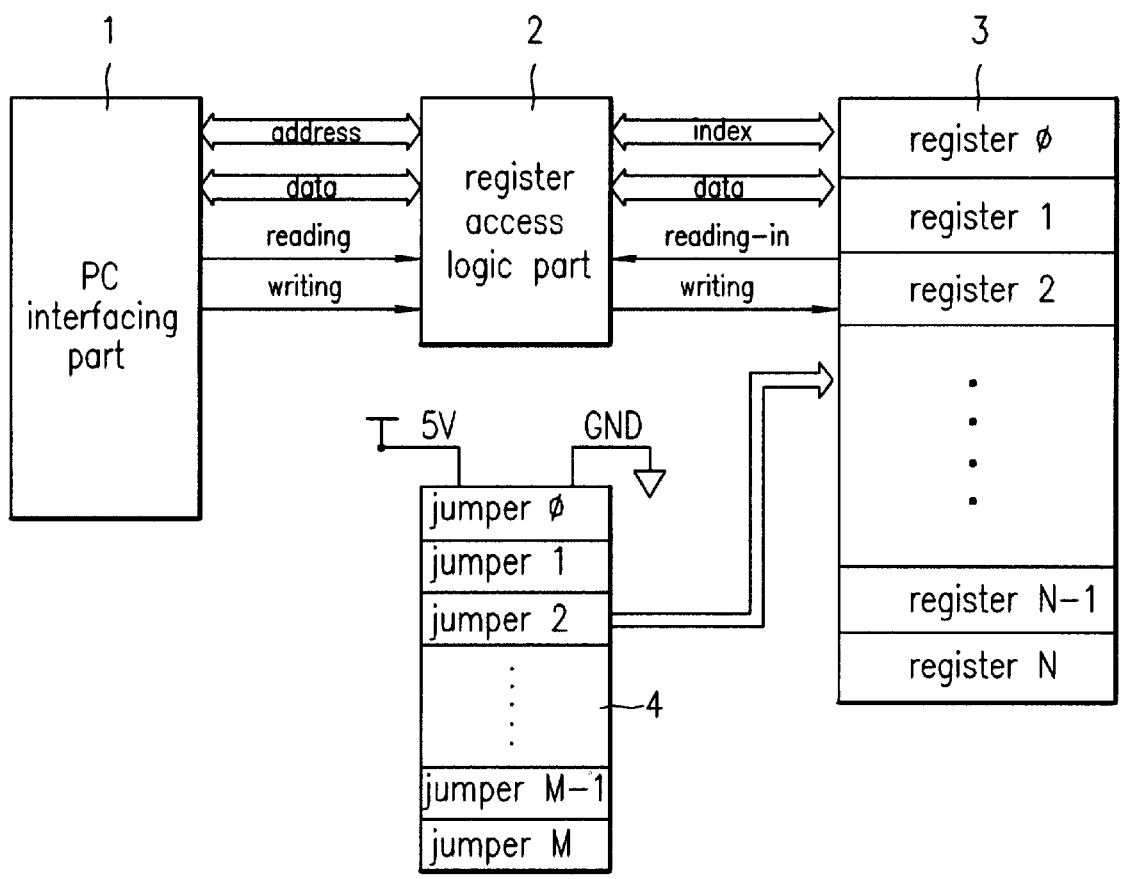
FIG. 1 is a block diagram of a system of a conventional option setting circuit.

Reference will now be made in detail to the preferred embodiments of the present invention, examples of which are illustrated in the accompanying drawings.

FIG. 2 is a block diagram of a system of an automatic option setting circuit in accordance with a preferred embodiment of the present invention, and FIGS. 3a–3b show timing diagrams of the option setting operation of the preferred embodiment.

Referring to FIG. 2, the automatic option setting circuit in accordance with a preferred embodiment of the present invention includes a PC interfacing part 20 having data/address lines and control signal lines (i.e., reading/writing and reset lines) for connecting an option setting part 21, a memory 22 and a configuration control register 24 to a main system (not shown) in a PC environment. The memory 22 is preferably a WE-ROM (Write Enable ROM) which stores information on option settings, and has a configuration region 25 and other option regions 26. The configuration control register 24 has a plurality of register storage locations (register 0–N) for assigning options settings to a device. The option setting part 21 is connected to the PC interface part 20 by its signal lines, is connected to the WE-ROM 22 by ROM address/data lines and ROM reading/writing lines, and is connected to the configuration control register 24 by index, data, read/write register signal lines. Using the address/data bus lines, the option setting part 21 automatically reads information stored in the WE-ROM 22 during power on start-up, and using the data line configures the configuration control register 24 for automatic storage of modified values in the WE-ROM 22 when the configuration control register 24 is modified by a program running on the main system or other reason.

An option mode detecting part 23 is connected to the option setting part 21, and detects access of the configuration control register 24 to set options. The option mode detecting part 23 also indicates such an access state.

The WE-ROM 22 is an electrically writable ROM, such as an EEPROM or a flash memory, and a portion of it (i.e., configuration region 25) serves as a hardware jumper (i.e., automatically pre-setting the configuration control register 24) and the other portions 26 serve as space for storing other options. The configuration control register 24 is a memory which stores option settings.

The operation of the aforementioned automatic option setting circuit in accordance with the preferred embodiment of the present invention will now be explained.

When the system is booted, the option setting part 21 reads in data from the configuration region 25 and sets a portion or the entire system of the configuration control register 24 according to the data in the configuration region 25 of the WE-ROM 22. The option settings data in the WE-ROM 22 has the same effect as a hardware jumper. Thereafter, when accessing the configuration control register 24, if the main system changes an option setting in the configuration control register 24, the option mode detecting part 23 detects this change and informs the option setting part 21 that a configuration cycle exists by outputting a configuration cycle start signal. Then, when access to the configuration control register 24 is finished, the option mode detecting part 23 informs the option setting part 21 that the configuration value changing cycle is finished by outputting a configuration cycle finish signal. Upon reception of the signal indicating that the configuration value changing cycle is finished, the option setting part 21 updates the option setting stored in the configuration value storage region of the WE-ROM 22 with the new option setting stored in the configuration control register 24. The updating of the WE-ROM 22 is carried out without using the main system and does not interfere with or degrade performance of the main system.

Because a configuration control register 24 is reset whenever the system is turned off (i.e., values in the control register are cleared), the control register 24 needs to be reconfigured when the system is turned on. When the main system is turned off, the PC interfacing part 20 applies a reset signal to the configuration control register 24 which, upon receiving the reset signal, clears its storage registers (i.e., registers 0–N)

The aforementioned automatic option setting circuit of the present invention modifies the configuration control register 24 without using a hardware jumper for manually setting options, and automatically maintains the set options. Accordingly, the automatic option setting circuit eliminates the inconvenience that the options need to be set using a program run by the main system every time the system is turned on. The data in the configuration regions of the WE-ROM 22 always represent the most recently modified configuration values or options of the configuration control register 24, and these values will be set as the values of the configuration control register 24 when the system is turned on again at a later time.

FIGS. 3a–3c illustrate a cycle in which the changed values of the configuration control register 24 are updated in the WE-ROM 22. FIG. 3a illustrates an option mode detecting part 23 initiating a configuration cycle start signal that begins a configuration cycle wherein option settings in the configuration control register 24 are changed. FIG. 3b illustrates the option mode detecting part 23 initiating a configuration cycle finish signal that completes a configuration cycle. FIG. 3c illustrates the updating cycle of the WE-ROM 22 with modified option settings which begin immediately after the completion of the configuration cycle. FIG. 3d illustrates a comparative relationship between a main operation cycle of the main system in relation to the configuration cycle and the updating cycle. As shown, the operation of updating the WE-ROM 22 has no impact on the operation of the main system. The updating operation is independent of the main operation cycle. Once the values in the configuration control register 24 are modified, the modified values are updated in the WE-ROM 22.

Since the automatic option setting circuit of the present invention can automatically set options of a system in a device with a rewritable memory using a portion of the memory as a region for storing configuration or option setting values, the automatic option setting circuit has the advantages of enhancing user convenience because it eliminates the inconveniences of manually adjusting options using a hardware jumper or from having a program run by the processing unit access the configuration register to set configuration values every time the system is turned on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic option setting circuit in a device for connecting to a computer, wherein said device forms a part of a computer system, the circuit comprising:

a configuration control register having at least one storage location, each storage location for storing option setting information for said device;

a non-volatile memory storing pre-settable option setting information, said pre-settable option setting information indicating operating characteristics of said device based on resources of said computer allocated to said device; and option processing means for pre-setting said storage location in said configuration control register with said pre-settable option setting information stored in said memory, said option processing means modifying option setting information in said configuration control register and automatically updating said memory with said modified option setting information independent of a main operation cycle of said computer system.

2. The circuit of claim 1, wherein said memory is a write-enable ROM.

3. The circuit of claim 1, wherein said memory includes a configuration storage region having a plurality of memory locations, each memory location for storing one of said pre-settable option setting information and said updated option setting information.

4. The circuit of claim 3, wherein each memory location corresponds to a storage location in said configuration control register.

5. The circuit of claim 1, wherein said memory includes a plurality of memory locations, each memory location corresponding to a storage location in said configuration control register.

6. The circuit of claim 1, wherein said option processing means pre-sets said storage location of said configuration control register with said pre-settable option setting information stored in said memory when said device is first turned on.

7. The circuit of claim 1, further comprising:

an interfacing part for interfacing said device with said computer and for receiving data to modify said option setting information in said configuration control register.

8. A method for automatically setting options in a device for connecting to a computer, comprising the steps of:

storing, in a memory of said device, pre-settable option setting information, said pre-settable option setting information indicating operating characteristics of said device based on resources of said computer allocated to said device;

pre-setting a configuration control register in said device, which supplies option setting information for said device, with said pre-settable option setting information from said memory;

modifying option setting information in said configuration register; and updating said memory with said modified option setting information in said configuration control register.

9. The method of claim 8, wherein said device forms a part of a computer system.

10. The circuit of claim 8, wherein said pre-setting step is performed when said computer is first turned on.

11. An automatic option setting circuit in a device for connecting to a computer, the circuit comprising:

a configuration control register having at least one storage location, each storage location for storing option setting information for said device;

a non-volatile memory storing pre-settable option setting information, said pre-settable option setting information indicating operating characteristics of said device based on resources of said computer allocated to said device;

option processing means for pre-setting said storage location in said configuration control register with said pre-settable option setting information stored in said memory; an option mode detecting circuit detecting when said option setting information is being stored in said configuration control register; and option setting circuit reading said pre-settable option setting information from said memory and writing said pre-settable option information into said configuration control register, and updating said option setting information in said memory based on output from said option mode detecting circuit.

12. The circuit of claim 11, wherein said memory is a write-enable ROM.

13. The circuit of claim 11, wherein said memory includes a configuration storage region having a plurality of memory locations, each memory location for storing one of said pre-settable option setting information and said updated option setting information.

14. The circuit of claim 13, wherein each memory location corresponds to a storage location in said configuration control register.

15. The circuit of claim 11, wherein said memory includes a plurality of memory locations, each memory location corresponding to a storage location in said configuration control register.

16. The circuit of claim 11, wherein said option processing means pre-sets said storage location of said configuration control register with said pre-settable option setting information stored in said memory when said device is first turned on.

17. The circuit of claim 11, further comprising an interfacing part for interfacing with said device and for receiving data to modify said option setting information in said configuration control register.

* * * * *